(12) United States Patent
Srinivasan et al.

(10) Patent No.: US 7,424,562 B2
(45) Date of Patent: Sep. 9, 2008

(54) INTELLIGENT PCI BRIDGING CONSISTING OF PREFETCHING DATA BASED UPON DESCRIPTOR DATA

(75) Inventors: Udayakumar Srinivasan, Milpitas, CA (US); Sampath Hosahally Kumar, San Jose, CA (US); Dattatri N. Mattur, Sunnyvale, CA (US); Madhu Rao, San Jose, CA (US); Abhay Ujwal Bhorkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 247 days.

(21) Appl. No.: 10/791,312

(22) Filed: Mar. 1, 2004

(65) Prior Publication Data

US 2005/0193158 A1 Sep. 1, 2005

(51) Int. Cl.
*G06F 13/00* (2006.01)
*G06F 13/36* (2006.01)
*G06F 13/20* (2006.01)

(52) U.S. Cl. .................. 710/112; 710/311; 710/313; 710/315

(58) Field of Classification Search ................. 710/112, 710/300, 306–315
See application file for complete search history.

(56) References Cited

U.S. PATENT DOCUMENTS

| | | | | |
|---|---|---|---|---|
| 5,606,665 A | * | 2/1997 | Yang et al. | 711/154 |
| 5,649,161 A | * | 7/1997 | Andrade et al. | 711/167 |
| 5,737,765 A | * | 4/1998 | Shigeeda | 711/170 |
| 5,761,464 A | | 6/1998 | Hopkins | |
| 5,815,662 A | * | 9/1998 | Ong | 725/92 |
| 5,913,045 A | * | 6/1999 | Gillespie et al. | 710/311 |
| 6,012,106 A | * | 1/2000 | Schumann et al. | 710/22 |
| 6,075,929 A | * | 6/2000 | MacLaren | 710/311 |
| 6,286,074 B1 | * | 9/2001 | Batchelor et al. | 710/305 |

(Continued)

FOREIGN PATENT DOCUMENTS

EP 1089188 A1 * 4/2001

(Continued)

OTHER PUBLICATIONS

Rosenberg, Jerry M., "Dictionary of Computers, Information Processing & Telecommunications", 1987, John Wiley & Sons, Inc., 2nd Edition, p. 268.*

(Continued)

*Primary Examiner*—Mark Rinehart
*Assistant Examiner*—Faisal M Zaman
(74) *Attorney, Agent, or Firm*—Marger Johnson & McCollom, P.C.

(57) ABSTRACT

A bridging device has at least two ports. The first port allows the device to communicate with devices on an expansion bus and at least one other port to allow the bridge to communicate with a system memory on a system bus or other devices on another expansion bus. The device is capable of identifying at least two regions in memory, a descriptor region and a data region. A descriptor provides information about segments of data in the data region. The bridge may detect descriptors read from the memory, extract information related to data associated with those descriptors and use this information to perform prefetching of data from the system memory.

14 Claims, 3 Drawing Sheets

U.S. PATENT DOCUMENTS

| | | | |
|---|---|---|---|
| 6,463,483 B1* | 10/2002 | Imperiali | 710/35 |
| 6,502,157 B1* | 12/2002 | Batchelor et al. | 710/310 |
| 6,636,927 B1* | 10/2003 | Peters et al. | 710/309 |
| 6,665,753 B1* | 12/2003 | Buckland et al. | 710/52 |
| 6,766,511 B1* | 7/2004 | Berry et al. | 717/128 |
| 6,820,161 B1* | 11/2004 | Perez | 710/306 |
| 6,934,417 B2* | 8/2005 | Easwar et al. | 382/235 |
| 6,963,954 B1* | 11/2005 | Trehus et al. | 711/137 |
| 6,973,528 B2* | 12/2005 | Bronson et al. | 710/310 |
| 2003/0051076 A1* | 3/2003 | Webber | 710/6 |
| 2003/0093608 A1* | 5/2003 | Jaramillo et al. | 710/310 |
| 2004/0177164 A1* | 9/2004 | DiMambro et al. | 709/250 |

FOREIGN PATENT DOCUMENTS

| | | |
|---|---|---|
| EP | 1246072 | 10/2002 |
| JP | 03078052 A * | 4/1991 |
| JP | 2001154823 A * | 6/2001 |
| JP | 2005184360 A * | 7/2005 |
| JP | 2006227821 A * | 8/2006 |

OTHER PUBLICATIONS

Lopez-Lagunas et al., "Memory Bandwidth Optimization Through Stream Descriptors", Mar. 2006, ACM, ACM SIGARCH Computer Architecture News, vol. 34, Issue 1, pp. 57-64.*

* cited by examiner

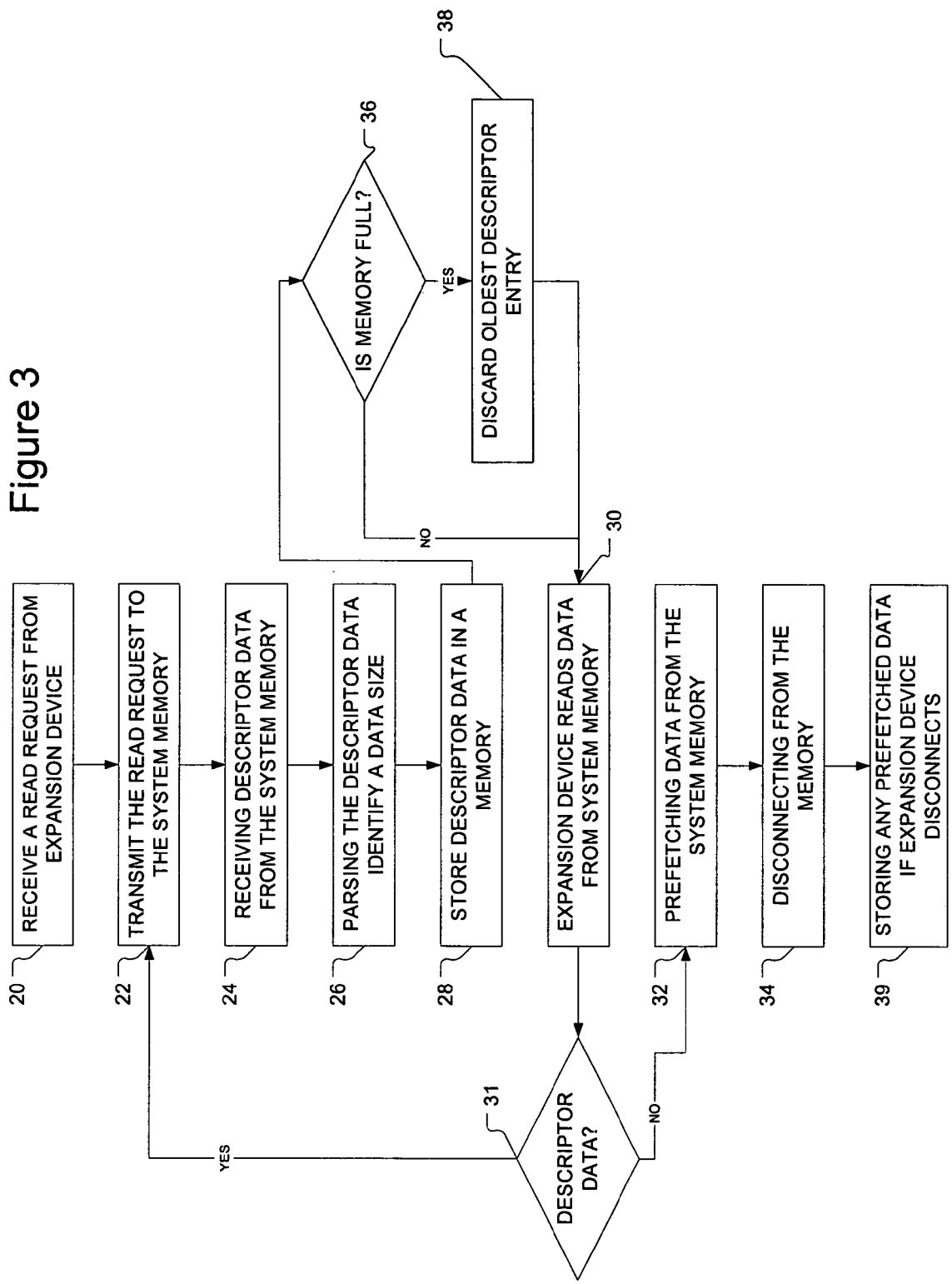

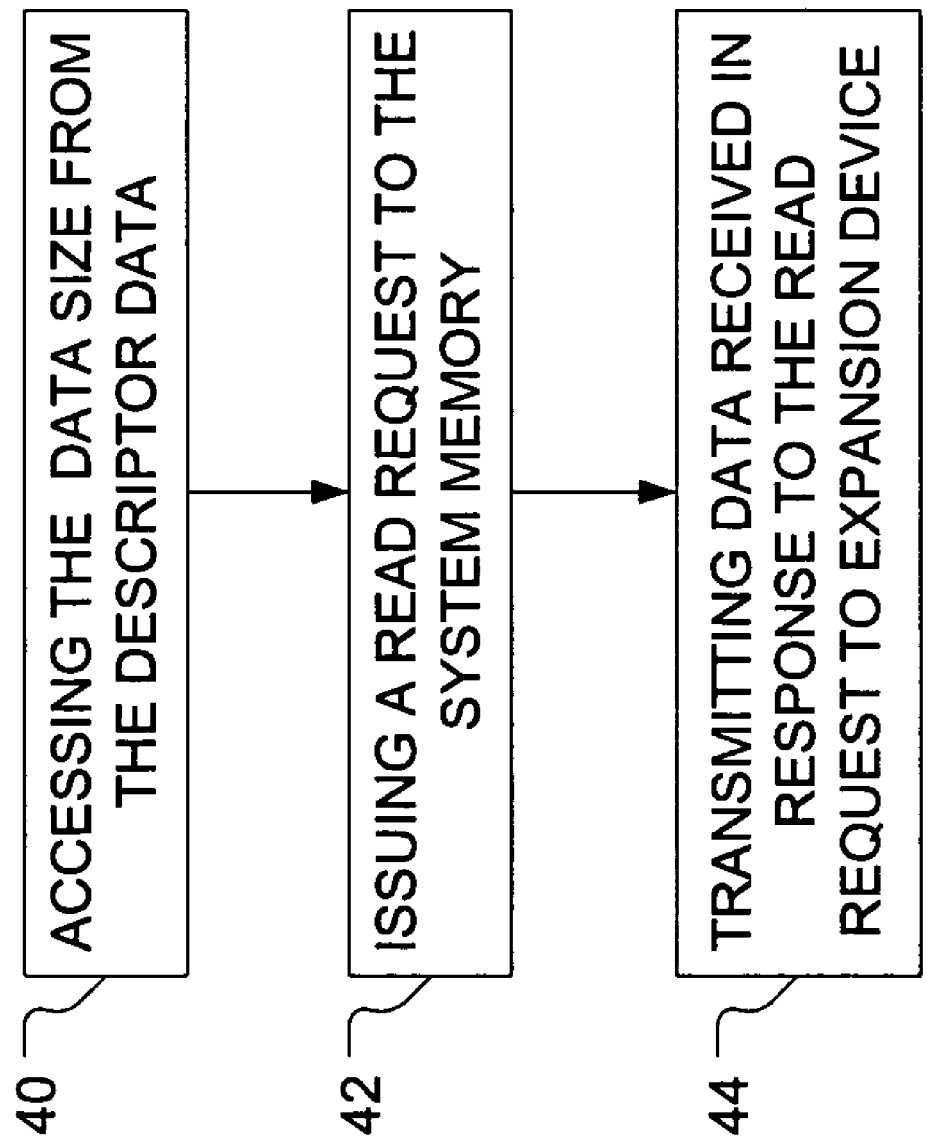

INTELLIGENT PCI BRIDGING CONSISTING OF PREFETCHING DATA BASED UPON DESCRIPTOR DATA

BACKGROUND

Many computer systems rely upon expansion busses to add functionality to the overall system. Generally, the added functionality takes the form of small printed circuit boards or other types of 'cards' that have on them the necessary components to allow the main processor to communicate with other devices. For example, video cards, audio cards, and network interface cards all provide added functionality to the system. The cards may communicate over an expansion bus, rather than being included on the main system bus.

Expansion busses are generally one of two types, an ISA (Industry Standard Architecture) bus or a PCI (Peripheral Component Interconnect) bus. The ISA standard was used initially, but became a bottleneck as processor speeds increased. Typically, most computer systems now employ PCI busses, or busses similar to PCI-X (PCI eXtended). The device that connects the PCI bus to the main system bus is usually referred to as a PCI bridge.

Expansion cards communicate with the CPU across the expansion bus. When the CPU needs an expansion device, such as a network interface card, to transmit data, it sets up a transmit ring in the memory to direct the device to the data to be transmitted by writing data descriptors to the transmit ring. The CPU then writes to a device control register set up in the system memory for the expansion device that will transmit the data. When the CPU wants to notify the device of its pending task, it will do so through the PCI bridge. The device then fetches one or more of the descriptors in a single PCI transaction (PCI burst) and then generally one packet at a time until the entire data to be transmitted is fetched. The device then transmits the data as requested by the CPU.

PCI bridges may 'read ahead' of a transaction, or 'prefetch' data from the system memory with the idea being that having the data available to the device at the PCI bridge, rather than in the system memory, would speed the process. Unfortunately, the bridge does not have a good estimate of how much data to prefetch. Bridges may end up prefetching too much data and having to discard the data. Prefetching of the data occupies the bus and the bridge, and wasting any data prefetched reduces the overall system efficiency.

This can lead to a high load on the PCI bus and the device, as well as slowing down the speed of transmission through the interface. It may also place a high load on the system memory, which in turn can slow down the effective speed of the CPU. This problem is compounded when another expansion bus is added to the system. When multiple busses exist in a system, there may be PCI bridges that bridge between the busses. These types of bridges are often referred to a PCI-to-PCI bridges, or P2P bridges. For ease of discussion, the term PCI bridge will be used to refer to both PCI and P2P bridges.

BRIEF DESCRIPTION OF THE DRAWINGS

Embodiments of the invention may be best understood by reading the disclosure with reference to the drawings, wherein:

FIG. 3 shows a flow chart of an embodiment of a method for processing an expansion bus transaction.

FIG. 4 shows a more detailed flow chart of an embodiment of a method to prefetch data.

DETAILED DESCRIPTION OF THE EMBODIMENTS

Figure 1:
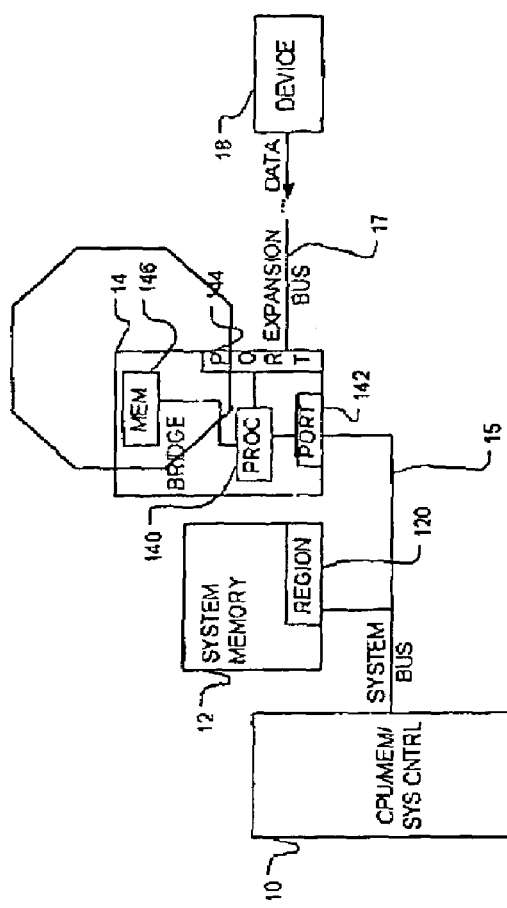
FIG. 1 shows an example of a system architecture employing a bridge.

FIG. 1 shows an embodiment of a system using an expansion bus. Devices, such as 18, reside on the expansion bus to add further functions and features to the system. The bridge device 14 provides communications between the system central processing unit 10, and device on the expansion bus 17. A bridge may reside on both the expansion bus and the local system bus 15, or it may reside between two expansion busses. The bridge may be a digital signal processor, general-purpose processor, or an application specific integrated circuit (ASIC), as examples. All of these, as well as other examples, will be referred to here as 'processing elements.'

In either case, the bridge will have a port 144 to allow it to communicate on the expansion bus 17, and another port 142 to allow it to communicate on the system bus 15 or on another expansion bus, not shown. In one embodiment the system is a network device that employs the expansion device 18 as a network interface card. The central processing unit may have data it wishes to transmit across a network. This transmission operation may be the subject of a transaction between the CPU 10 and the device 18.

In general, in order to assist with the transaction, the bridge may institute a prefetching process to bring the data closer to the expansion device more quickly. Currently, however, the prefetching process relies on a prediction of how much data is needed, as there is no current means to communicate how much data is required for a transaction to the bridge devices. This results in adaptations of the prefetching process to overcome this lack of knowledge. One such process, set out in U.S. patent application Ser. No. 10/742,185, uses a smart discard approach.

The smart discard approach is necessary because the bridge may prefetch data into the bridge and then have it become stale. Stale data is that data that does not reflect changes to the data made in the system memory. Stale data arises in part because the bridge does not know how much data to prefetch. A prefetch is generally the result of a read transaction from an expansion device.

Figure 2:
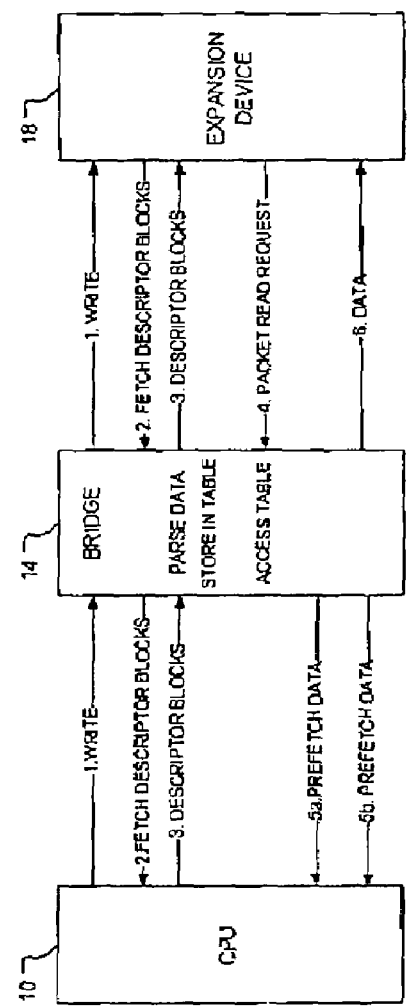
FIG. 2 shows a simplified block diagram of a system employing a bridge during an expansion bus transaction cycle.

An example of a transaction is shown in FIG. 2. It must be noted that this diagram has been simplified for ease of discussion, and any ordering is merely for the same reason. The embodiments of the invention apply to other sequences as well. The CPU 10 is part of the system block that would include the system memory 12. The CPU 10 writes a series of descriptor blocks into a predetermined region of memory, such as region 120 of FIG. 1. These descriptor blocks describe the data to be transmitted, such as the addresses and size of each portion of data to be transmitted. The CPU then writes to the expansion device, requesting that the expansion device transmit the data across the network.

The bridge 14 then passes the write on to the expansion device 18, in this embodiment a network interface card, such as an Ethernet or other protocol interface card. The expansion device then issues a read request to fetch the descriptor blocks. The bridge passes this request onto the system, but also notes that the bridge should analyze the response from that portion of the memory. The bridge has knowledge of which portions of memory are used for descriptor blocks, so when the read request for addresses within that portion of memory passes through the bridge, the bridge identifies the request as one for which there may be a prefetch process needed.

The knowledge about the descriptor blocks used by a particular expansion device would typically be configured into the bridge when the device initializes. The software that allows the device to communicate with the outside world, the device driver, would configure the bridge with the information that would allow the bridge to recognize a read request for the descriptor blocks. The information may be the descriptor address space, offset of the packet length and the buffer address and descriptor size, and the ending address. Essentially, the necessary information is where the descriptors reside, and where in a descriptor block the bridge can find the length of the data to be transmitted, the length of the descriptor and the address of the particular packet to be transmitted.

When the descriptor blocks are read from system memory and pass through the ridge, the bridge would transmit them to the expansion device. In addition, the bridge parses the descriptor to locate the size of the packet to be transmitted, referred to here as the packet length or the transmit size, the location of the packet data, or the address of the data to be operated upon by the device will be referred to here as the descriptor data. The bridge then stores the descriptor data in a table or other local memory 146 on the bridge.

Storage in the table will probably involve storage in a hash table. A hash table uses shorter addresses, typically that last byte or two bytes of a full address. This allows for faster indexing of the data by the bridge to locate the desired data. If multiple descriptors are fetched, all the descriptor addresses are optimized and stored for faster access. The expansion device, having received its descriptor blocks, then issues a read request for the data.

The bridge now responds to that request by searching the hash table for the corresponding descriptor data using the address of the data in the read request as the key and determining the transmit size, then fetching the data requested as well as prefetching all of the necessary data for the expansion device. The bridge may prefetch the data based upon a read request or even before the read request.

For example, assume the packet length is 128 bytes and assume the device can only read 32 bytes at a time, which corresponds to "burst length" in PCI specification. When the device makes the request to read the first 32 bytes, the bridge can prefetch the entire 128 bytes. The bridge knows from the hash table the complete size of the packet. Requests for the remaining 3 sets of 32 bytes of the packet from the device can be delivered by the bridge without going to the system memory as it as already prefetched the complete packet of 128 bytes.

The bridge could start prefetching before the first request, but this scheme will be a little more difficult to manage and the bridge will have to be more intelligent. Both schemes are possible and are included in the scope of this invention.

Allowing the bridge to have the knowledge needed to prefetch the data needed, not more data which results in data discards, and not less data, which requires more reads to retrieve the needed data, increases the efficiency of the system. An embodiment of the process at the bridge is shown in flowchart form in FIG. 3.

At 20, the bridge receives the read request from the expansion device. This is the read request triggered by the CPU write to the expansion device. At 22 the read request is issued to the portion of system memory predetermined to have the descriptor addresses. At 24, the descriptor blocks including the descriptor data are received at the bridge. The bridge parses the descriptor data to identify the size of the data transmission at 26.

The descriptor data is then stored in the hash table memory at 28. If the memory is full at 36, which is unlikely but could happen on a high volume, multi-channel device, the oldest descriptor is discarded and the space reused for the new descriptor at 38. Another advantage of this process is that the table in which the descriptor data is stored only has to be accessed once. It will then be freed up for other devices or processes to access it.

In an alternative to the discarding of the oldest entry, the bridge may track the status of the data. The bridge may be able to determine if the device has consumed all of the data associated with a particular descriptor. If the data has been consumed, it can either be marked as 'used' data, or flushed.

After fetching the descriptor, the expansion device tries to read the packet from the system memory through the bridge in order to transmit it out at 30. The bridge scans the address to see if it falls in the descriptor address space at 31. If it does, the process returns to 22. Otherwise, the bridge scans the hash table for that address.

If no match is found in the hash table, then the bridge behaves like a standard bridge and prefetches data based on cacheline size and the PCI command. If a match is found, the bridge knows that the device is trying to access a packet for transmission. From the hash table the bridge knows the packet size and prefetches the whole packet. At 32, the bridge begins prefetching the data from the system memory. The bridge knowing the transmit size has several benefits. Once the bridge has all of the data it needs for a particular prefetch process, the bridge can disconnect from the system bus at 34, or the expansion bus on the system bus side of the bridge, and remain connected to the expansion bus upon which the expansion device resides. This decreases the load on the system, or system-side bus.

Currently, if a bridge close to the CPU breaks a transaction before the complete packet is transferred, the device has to reinitiate a request for the remaining data. In the embodiments of the invention, the bridge knows exactly how much data in which the device is interested, and can prefetch the remaining data without a request from the device shown at 39. When the device reconnects and reinitiates the request, the bridge can handle the request locally, avoiding the overhead and delay involved in going back to the CPU.

As mentioned above, the prefetching of the data may have several parts to the process. When the read request comes into the bridge, the bridge accesses the descriptor data from the table and determines the transmit data size at 40 in FIG. 4. Also as mentioned above, this information may be in the form of an offset length into the descriptor data at which the packet length is located.

At 42 a read request for a particular size is issued to the system memory. In PCI systems, the read request may be a memory read (MR), a memory read line (MRL) or a memory read multiple line (MRM). An MR is typically 4 bytes of data, also the typical length of the descriptor blocks, and an MRL is for a cache line size, where the cache line size is configured when the bridge is initialized. An MRM is for some multiple of the cache line size. When the data of whichever size arrives back at the bridge, the data is then transmitted to the expansion device at 44.

In this manner, the expansion device receives the data it requires, such as that to be transmitted across the network, with minimal overhead on the system bus. In addition, the data is acquired with little waste in the prefetching process. The prefetching process reduces the load on the system bus.

The embodiments of a prefetching process as set out here avoid the waste and inefficiency that can come with some prefetching processes as discussed above.

Thus, although there has been described to this point a particular embodiment for a method and apparatus for improving efficiency in systems using expansion busses and bridges, it is not intended that such specific references be considered as limitations upon the scope of this invention except in-so-far as set forth in the following claims.

What is claimed is:

1. A method, comprising:
   receiving, at a bridge device, a read request across an expansion bus from an expansion device to a portion of a system memory predetermined to have descriptor addresses;
   issuing a read request from the bridge device across a system bus to fetch the descriptor addresses from the system memory;
   receiving descriptor blocks including descriptor data at the bridge device across the system bus, wherein the descriptor data includes a transmit size of transmit data from the system memory to the expansion device, a location of the transmit data, and an address of the transmit data, and wherein the transmit size indicates an amount of data that the bridge device may pre-fetch from the system memory for the expansion device such that requests for the transmit data from the expansion device are handled entirely at the bridge device without involving the system memory;
   storing the descriptor data in a memory on the bridge;
   transmitting the descriptor blocks from the bridge device to the expansion device across the expansion bus;
   receiving, at the bridge device, a read request from the expansion device for at least a portion of the transmit data, wherein the read request includes a read request address;
   searching the memory on the bridge for the read request address; and
   if the read request address is located in the memory on the bridge, fetching the portion of the transmit data requested and prefetching any remaining transmit data to match the transmit size by the bridge device, such that any subsequent request for the prefetched transmit data from the expansion device is handled at the bridge device without involving the system memory.

2. The method of claim 1, wherein storing the descriptor data comprises storing the descriptor data in a hash table.

3. The method of claim 2, wherein searching the memory on the bridge further comprises searching the hash table using a read request address as a key.

4. The method of claim 1, the method comprising prefetching the transmit data by cacheline, if the read request address is not locating in the memory on the bridge.

5. The method of claim 1, wherein storing the descriptor data comprises:
   determining that the memory on the bridge is full;
   discarding an oldest descriptor in the memory on the bridge; and
   storing the descriptor in the memory on the bridge.

6. A processor having software that causes the processor to:
   receive, at a bridge device, a read request across an expansion bus from an expansion device to a portion of a system memory predetermined to have descriptor addresses;
   issue a read request from the bridge device across a system bus to fetch the descriptor addresses from the system memory;
   receive descriptor blocks including descriptor data at the bridge device across the system bus, wherein the descriptor data includes a transmit size of transmit data from the system memory to the expansion device, a location of the transmit data, and an address of the transmit data, and wherein the transmit size indicates an amount of data that the bridge device may pre-fetch from the system memory for the expansion device such that requests for the transmit data from the expansion device can be handled entirely at the bridge device without involving the system memory;
   store the descriptor data in a memory on the bridge;
   transmit the descriptor blocks from the bridge device to the expansion device across the expansion bus;
   receive, at the bridge device, a read request from the expansion device for at least a portion of the transmit data, wherein the read request includes a read request address;
   search the memory on the bridge for the read request address; and
   if the read request address is located in the memory on the bridge, fetch the portion of the transmit data requested and prefetch any remaining transmit data to match the transmit size by the bridge device, such that any subsequent request for the prefetched transmit data from the expansion device is handled at the bridge device without involving the system memory.

7. The processor of claim 6, the software causing the processor to store the descriptor data comprises storing the descriptor data in a hash table.

8. The processor of claim 6, the software causing the processor to search the memory on the bridge further comprises searching the hash table using a read request address as a key.

9. The processor of claim 6, the software causing the processor to prefetch the transmit data by cacheline, if the read request address is not locating in the memory on the bridge.

10. A bridge device, comprising:
    a first port to allow the device to communicate with other devices on an expansion bus;
    a second port to allow the device to communicate with devices on a second bus;
    a memory to store data; and
    a processing element to:
      receive, at a bridge device, a read request from an expansion device to a portion of a system memory predetermined to have descriptor addresses;
      issue a read request from the bridge device across a system bus to fetch the descriptor addresses from the system memory;
      receive descriptor blocks including descriptor data, wherein the descriptor data includes a transmit size of transmit data from the system memory to the expansion device, a location of the transmit data, and an address of the transmit data, and wherein the transmit size indicates an amount of data that the bridge device may pre-fetch from the system memory for the expansion device such that requests for the transmit data from the expansion device can be handled entirely at the bridge device without involving the system memory;
      store the descriptor data in a memory on the bridge;
      transmit the descriptor blocks from the bridge device to the expansion device;
      receive a read request from the expansion device for at least a portion of the transmit data, wherein the read request includes a read request address;
      search the memory on the bridge for the read request address; and if the read request address is located in the memory on the bridge, fetch the portion of the transmit data requested and prefetch any remaining transmit data to match the transmit size, such that any subsequent request for the prefetched transmit data from the expansion device is handled at the bridge device without involving the system memory.

11. The device of claim 10, the processing element to store the descriptor data comprises storing the descriptor data in a hash table.

12. The device of claim 10, the processing element to search the memory on the bridge further comprises searching the hash table using a read request address as a key.

13. The device of claim 10, the processing element to prefetch the transmit data by cacheline, if the read request address is not locating in the memory on the bridge.

14. A bridge device, comprising:
a means for allowing the device to communicate with other devices on an expansion bus;
a means for allowing the device to communicate with devices on a second bus;
a means for storing data; and
a means for:
receiving, at a bridge device, a read request from an expansion device to a portion of a system memory predetermined to have descriptor addresses;
issuing a read request from the bridge device across a system bus to fetch the descriptor addresses from the system memory receiving descriptor blocks including descriptor data, wherein the descriptor data includes a transmit size of transmit data from the system memory to the expansion device, a location of the transmit data, and an address of the transmit data, and wherein the transmit size indicates an amount of data that the bridge device may pre-fetch from the system memory for the expansion device such that requests for the transmit data from the expansion device can be handled entirely at the bridge device without involving the system memory;

storing the descriptor data in a memory on the bridge;

transmitting the descriptor blocks from the bridge device to the expansion device;

receiving a read request from the expansion device for at least a portion of the transmit data, wherein the read request includes a read request address;

searching the memory on the bridge for the read request address; and if the read request address is located in the memory on the bridge, fetching the portion of the transmit data requested and prefetching any remaining transmit data to match the transmit size, such that any subsequent request for the prefetched transmit data from the expansion device is handled at the bridge device without involving the system memory.

* * * * *

UNITED STATES PATENT AND TRADEMARK OFFICE
CERTIFICATE OF CORRECTION

| | | |
|---|---|---|
| PATENT NO. | : 7,424,562 B2 | |
| APPLICATION NO. | : 10/791312 | |
| DATED | : September 9, 2008 | |
| INVENTOR(S) | : Udayakumar Srinivasan et al. | |

It is certified that error appears in the above-identified patent and that said Letters Patent is hereby corrected as shown below:

Figure 1, the hexagonal shape over block 14 should be deleted.

Signed and Sealed this
Twelfth Day of February, 2013

Teresa Stanek Rea
*Acting Director of the United States Patent and Trademark Office*